US012799876B2

(12) United States Patent
Zebian et al.

(10) Patent No.: US 12,799,876 B2

(45) Date of Patent: Nov. 17, 2026

(54) PROPULSION ASSEMBLY FOR AN AIRCRAFT COMPRISING A FLUID-COOLING CIRCUIT WITH QUICK-FIT NACELLE/ENGINE COUPLINGS AND AIRCRAFT PROVIDED WITH SUCH AN ASSEMBLY

(71) Applicant: Airbus Operations SAS, Toulouse (FR)

(72) Inventors: Maxime Zebian, Toulouse (FR); Laurent Cazeaux, Toulouse (FR); Laurent Presseq, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 54 days.

(21) Appl. No.: 18/971,796

(22) Filed: Dec. 6, 2024

(65) Prior Publication Data

US 2025/0188851 A1 Jun. 12, 2025

(30) Foreign Application Priority Data

Dec. 8, 2023 (FR) ....................................... 2313845

(51) Int. Cl.
*F01D 25/12* (2006.01)
*F01D 25/14* (2006.01)

(52) U.S. Cl.
CPC ............. *F01D 25/12* (2013.01); *F01D 25/14* (2013.01); *F05D 2220/323* (2013.01);
(Continued)

(58) Field of Classification Search
CPC ......... B64D 29/06; B64D 33/08; F01D 25/14; F01D 25/12; F02C 7/14; F05D 2220/323;
(Continued)

(56) References Cited

U.S. PATENT DOCUMENTS

| | | | | |
|---|---|---|---|---|
| 3,873,062 | A | 3/1975 | Johnson et al. | |
| 7,845,159 | B2 * | 12/2010 | Venkataramani ......... | F02C 7/14 60/39.08 |

(Continued)

FOREIGN PATENT DOCUMENTS

| | | | |
|---|---|---|---|
| EP | 3640467 | A1 | 4/2020 |
| FR | 3098289 | A1 | 1/2021 |

(Continued)

OTHER PUBLICATIONS

Machine Translation of KR20190071093A; Retrieved from Espacenet on Mar. 21, 2026 (Year: 2026).*

(Continued)

*Primary Examiner* — Sang K Kim

(74) *Attorney, Agent, or Firm* — Greer, Burns & Crain, Ltd.

(57) ABSTRACT

A propulsion assembly for an aircraft with an engine; an inner structure formed by two half-shells, each half-shell articulated to a pylon and comprising a semi-cylindrical part movable between a closed position, in which the half-shell is closely fitted around the engine, and an open position, in which the half-shell is away from the engine; and, a fluid circuit. At least one half-shell has a cooling circuit connected to the fluid circuit. A detachable hydraulic interface between the fluid circuit and the cooling circuit is provided having at least two quick-fit couplings, wherein each of the quick-fit couplings comprises a pair of male/female elements configured for axial fitting of one in the other, with one element of the pair being fixed on the half-shell and the other element of the pair being integral with the engine.

8 Claims, 9 Drawing Sheets

(52) U.S. Cl.
CPC .... *F05D 2240/14* (2013.01); *F05D 2260/213* (2013.01); *F05D 2260/30* (2013.01)

(58) Field of Classification Search
CPC ........... F05D 2240/14; F05D 2260/213; F05D 2260/30
See application file for complete search history.

(56) References Cited

U.S. PATENT DOCUMENTS

| | | | | |
|---|---|---|---|---|
| 11,293,348 | B2 | 4/2022 | Zebian | |
| 12,281,587 | B2 * | 4/2025 | Rust | F01D 25/24 |
| 2015/0308339 | A1 | 10/2015 | Forcier | |
| 2020/0049028 | A1 | 2/2020 | Oriol et al. | |
| 2020/0182389 | A1 | 6/2020 | Frere | |
| 2020/0300164 | A1 | 9/2020 | Muldoon et al. | |
| 2025/0067216 | A1 * | 2/2025 | Toubiana | F02C 7/14 |

FOREIGN PATENT DOCUMENTS

| | | | | |
|---|---|---|---|---|
| FR | 3142459 | A1 | 5/2024 | |
| KR | 20190071093 | A * | 6/2019 | F16L 37/127 |
| WO | WO-2024110717 | A1 * | 5/2024 | B64D 29/06 |

OTHER PUBLICATIONS

Machine Translation of WO2024110717A1; Retrieved from Espacenet on Mar. 21, 2026 (Year: 2026).*

French Search Report and Written Opinion for corresponding French Patent Application No. 2313845 dated Jun. 10, 2024; 12 pages.

* cited by examiner (PRIOR ART)

(PRIOR ART)

PROPULSION ASSEMBLY FOR AN AIRCRAFT COMPRISING A FLUID-COOLING CIRCUIT WITH QUICK-FIT NACELLE/ENGINE COUPLINGS AND AIRCRAFT PROVIDED WITH SUCH AN ASSEMBLY

CROSS-REFERENCES TO RELATED APPLICATIONS

This application claims the benefit of French Patent Application Number 2313845 filed on Dec. 8, 2023, the entire disclosure of which is incorporated herein by way of reference.

FIELD OF THE INVENTION

The present invention relates to a propulsion assembly for an aircraft comprising a fluid-cooling circuit.

With respect to FIGS. 1*a* and 1*b*, a propulsion assembly 1 mounted underneath a wing 2 of an aircraft by means of a pylon 3 includes a turbomachine comprising an engine 5 surrounded by a nacelle. While the engine 5 is in operation, air enters the nacelle and then is divided into a primary stream (not shown) which flows through the engine 5 and a secondary stream F2 which is channeled between the engine 5 and the nacelle 6, in a secondary duct 7. The secondary duct 7 is delimited on the outside by an outer structure 6*a* of the nacelle and on the inside by an inner structure 6*b* of the nacelle, which forms a sealed compartment around the engine 5.

The inner structure 6*b* is formed by two half-shells 8 distributed one on each side of the engine 5 (a single half-shell is shown in FIGS. 1*a* and 1*b*; the other half-shell, which is not shown, is a mirror image of the half-shell shown). Each half-shell 8 comprises an upper bifurcated portion 19*a*, a lower bifurcated portion 19*b* and a semi-cylindrical part 13 between the two portions. Each half-shell 8 is articulated to the pylon 3 at its upper bifurcated portion 19*a* and can pivot between a closed position (FIG. 1*a*), in which the half-shell 8 is closely fitted around the engine 5 by way of its semi-cylindrical part 13 which partially surrounds the engine 5, and an open position (FIG. 1*b*), in which the half-shell 8 is away from the engine 5.

BACKGROUND OF THE INVENTION

It is known, for example from patent EP3640467, to cool the oil needed for the operation of the engine 5 by circulating it in a cooling circuit 9 arranged in one of the half-shells 8. The cooling circuit 9 makes use of a quantity of cold air withdrawn from the secondary duct 7 to cool the oil heated by the operation of the engine 5. The cooling circuit 9 is connected to the oil circuit (not shown) of the engine 5 by means of hoses 11 that are routed through the articulated connection between the half-shell 8 and the pylon 3 and connect the pylon to the upper bifurcated portion 19*a*. When the half-shell 8 is in the open position, operator access to the hoses 11 for necessary maintenance is complicated by the small spacing between the half-shell 8 and the engine 5 in this zone and by the space required in the zone by various systems.

SUMMARY OF THE INVENTION

There is a need to find a solution to overcome this drawback in order to make maintenance operations on the engine easier and faster and thereby increase the availability of aircraft.

To that end, what is proposed is a propulsion assembly for an aircraft, comprising:

- an engine;
- two half-shells arranged one on each side of a longitudinal median plane of the engine, wherein each half-shell comprises an upper bifurcation continued by a semi-cylindrical part, each half-shell being intended to be hinged to a pylon at its upper bifurcation and to be movable between a closed position, in which the half-shell is closely fitted around the engine by way of its semi-cylindrical part that partially surrounds the engine, and an open position, in which the half-shell is away from the engine;
  - a fluid circuit;
  - at least one half-shell being equipped with a cooling circuit connected to the fluid circuit;
- the propulsion assembly comprising a detachable hydraulic interface between the fluid circuit and the cooling circuit, the detachable hydraulic interface comprising at least two quick-fit couplings, wherein each of the quick-fit couplings comprises a pair of male/female elements configured for axial fitting of one in the other, with one element of the pair being fixed on the semi-cylindrical part of the half-shell and the other element of the pair being integral with the engine.

The invention meets the aforementioned need by eliminating the hoses in the zone above the engine and replacing them with a detachable hydraulic interface which is easier to access.

BRIEF DESCRIPTION OF THE DRAWINGS

Other aims, features and advantages will become apparent from the following description of the invention, which description is given by way of solely non-limiting example, with reference to the accompanying drawings, in which.

DETAILED DESCRIPTION OF THE PREFERRED EMBODIMENTS

Figure 1A:
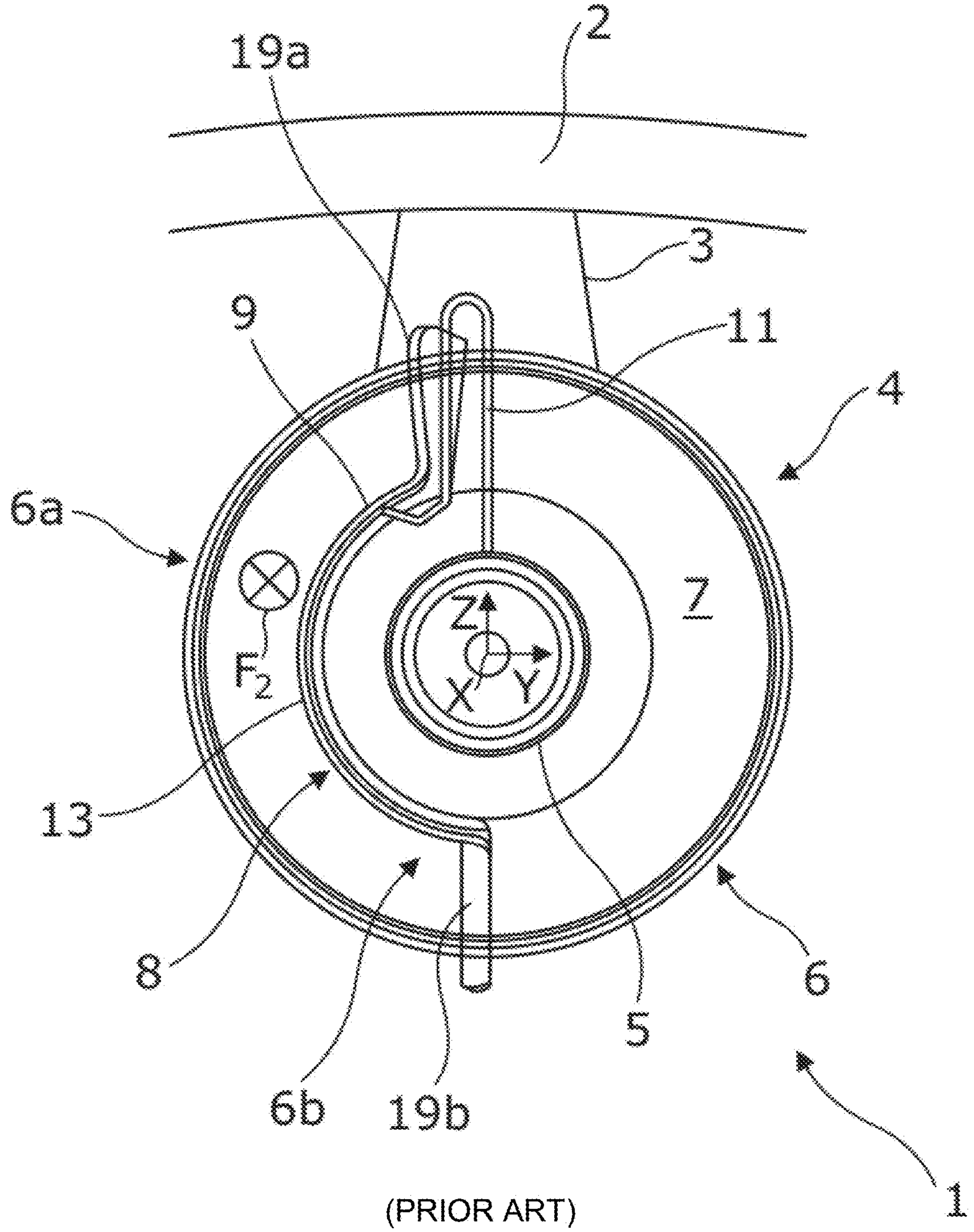
FIG. 1*a* is a schematic front view of a propulsion assembly of the prior art, one half-shell of the nacelle of which is in the closed position.
Figure 1B:
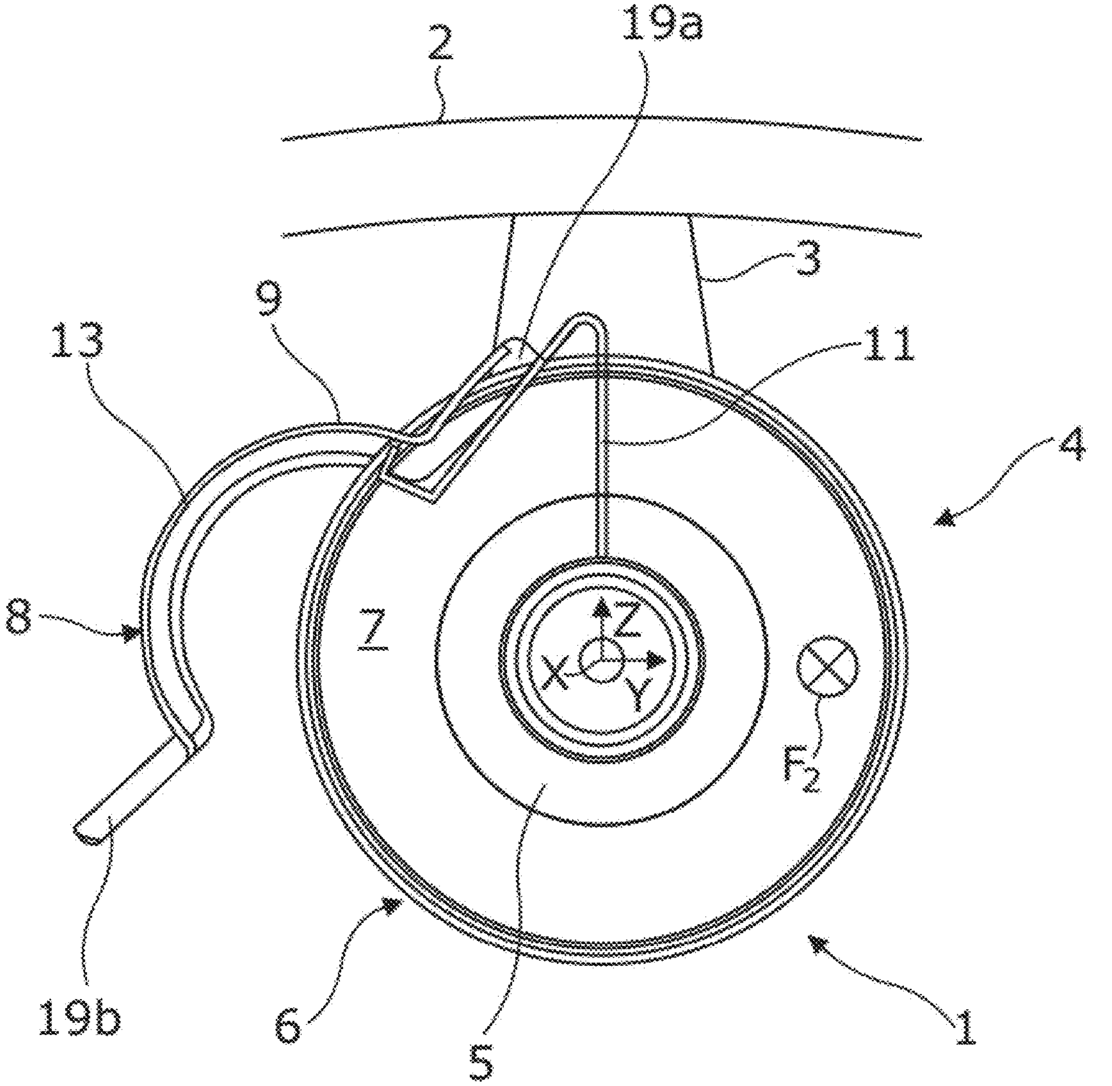
FIG. 1*b* is a view similar to FIG. 1*a*, showing a propulsion assembly of the prior art, one half-shell of which is in the open position.
Figure 2:
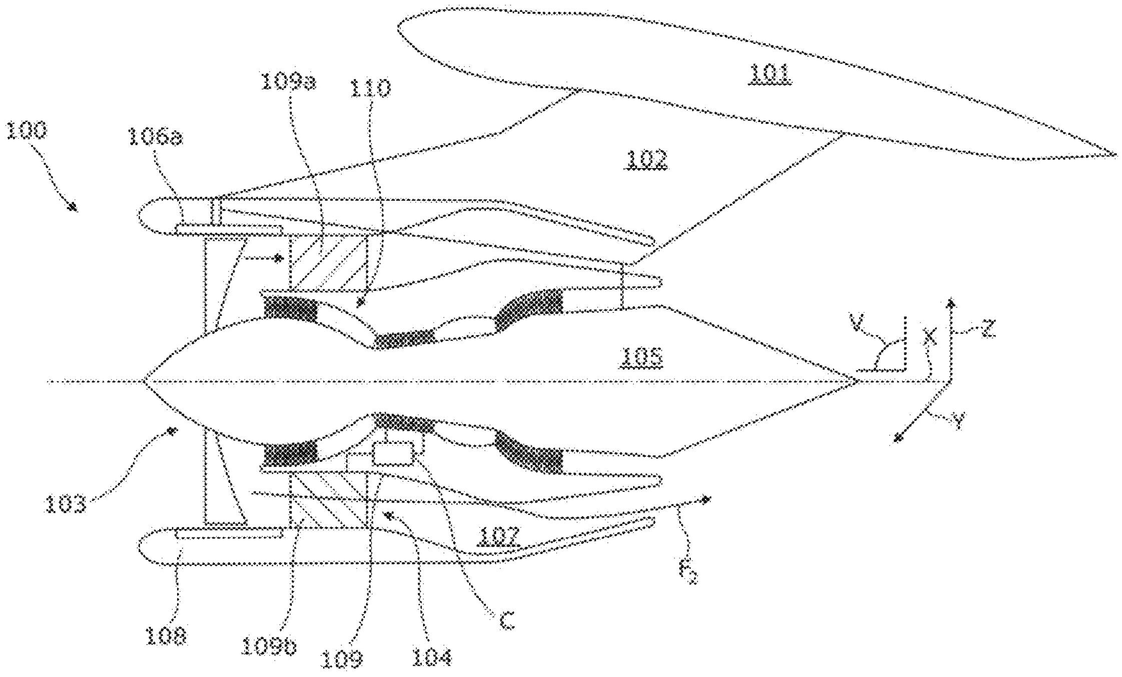
FIG. 2 is a schematic view, in a longitudinal section, of a propulsion assembly attached to a wing of an aircraft according to the invention.

In relation to FIGS. 2 to 3*b* and 10, a propulsion assembly 100 is mounted underneath a wing 101 of an aircraft 106 by means of a pylon 102. The propulsion assembly comprises a turbomachine 103 surrounded by a nacelle 104. The turbomachine 103 comprises an engine 105 and a secondary duct 107 in which circulates a secondary air stream F2 which is propelled towards the rear of the engine 105 when the engine is in operation.

In the following description, and by convention, X denotes the longitudinal axis of the engine which is oriented positively in the direction of forward movement of the aircraft and which is horizontal when the aircraft is on the ground, Y denotes the transverse direction, and Z denotes the vertical axis, or the vertical height when the aircraft is on the ground, these three directions X, Y and Z being mutually orthogonal.

The secondary duct 107 which extends along the axis X is delimited on the outside by an outer structure 108 of the nacelle 104 and on the inside by an inner structure 109 of the nacelle 104.

The inner structure 109 comprises an upper bifurcation 109*a* above the engine 105, a lower bifurcation 109*b* underneath the engine 105, and a cylindrical part 110 which is between the two bifurcations and surrounds the engine 105. The two bifurcations 109*a-b* both extend vertically, along the axes X and Z.

Figure 3A:
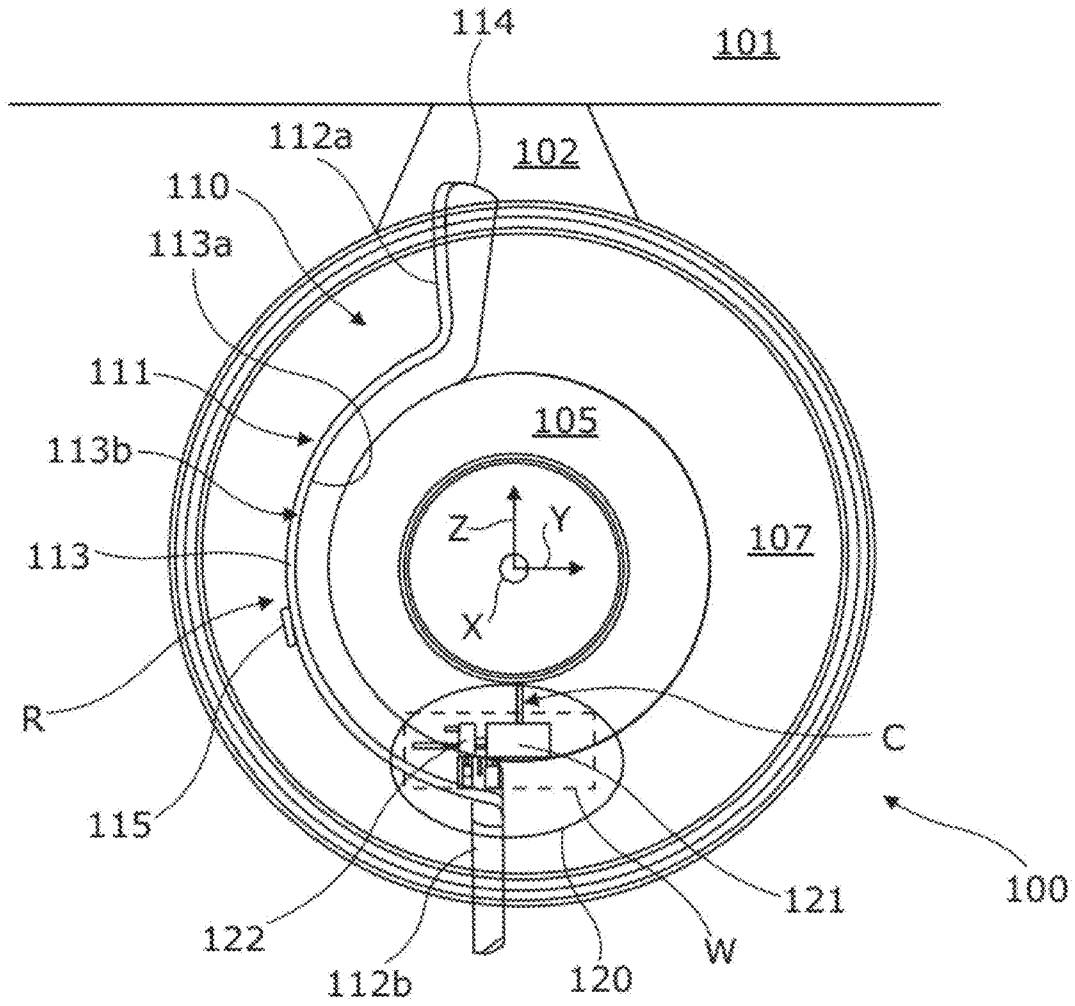
FIG. 3*a* is a schematic front view of the propulsion assembly in FIG. 2 comprising a nacelle, one half-shell of which is in the closed position, according to one embodiment of the invention.
Figure 3B:
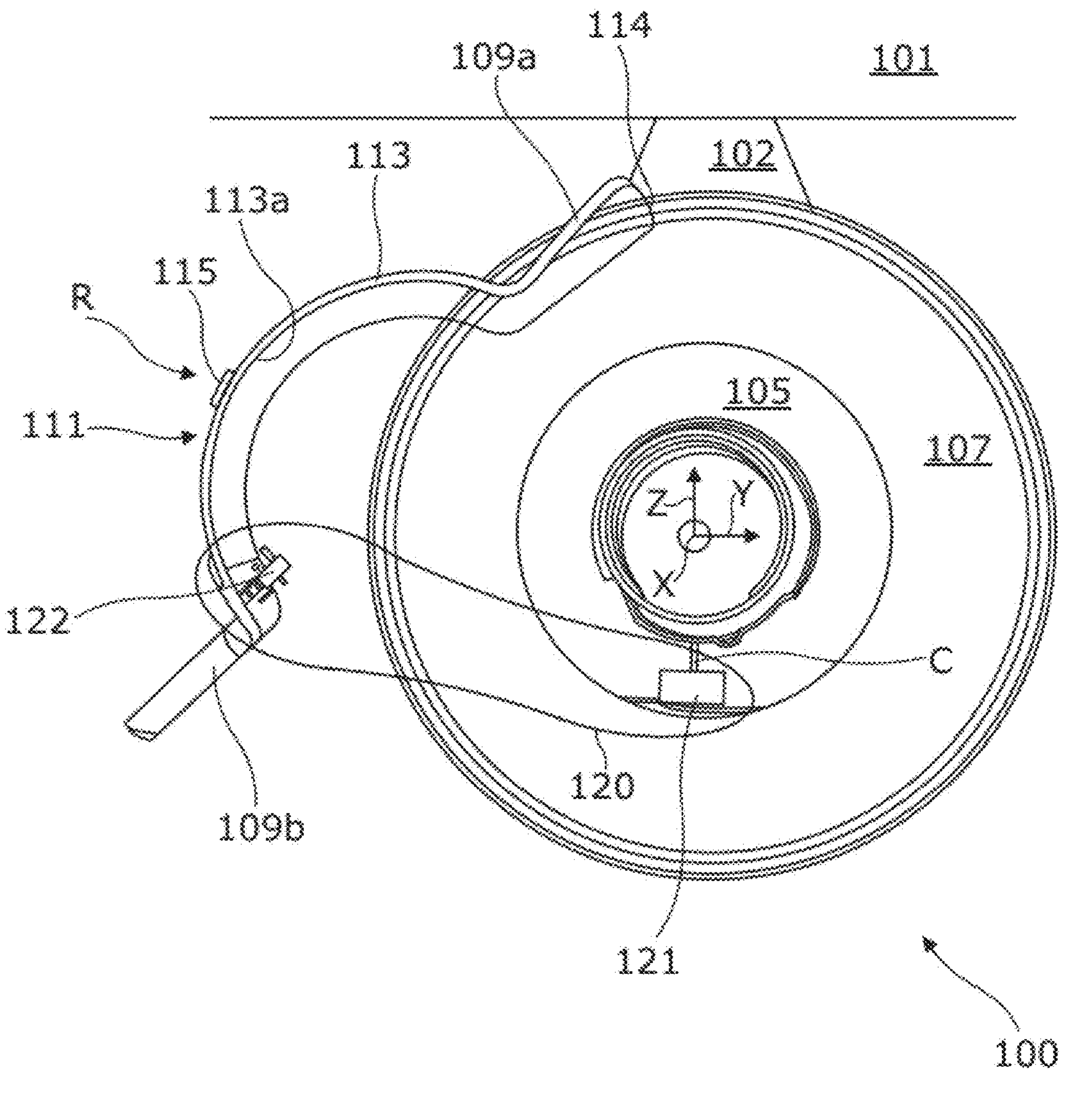
FIG. 3*b* is a view similar to FIG. 3*a*, showing the propulsion assembly in FIG. 2, one half-shell of which is in the open position, according to the same embodiment of the invention.

The cylindrical part 110 is formed by two half-shells 111 (a single half-shell 111 is shown in FIGS. 3*a* and 3*b*) which are arranged one on each side of a longitudinal median plane V (plane parallel to the axes X and Z) of the engine 105 and are mutually symmetrical with respect to this plane. Each of the two half-shells 111 comprises an upper bifurcated portion 112*a*, a lower bifurcated portion 112*b* and a semi-cylindrical part 113 between the two portions. The internal skin 113*a* of the semi-cylindrical part 113 faces the engine 105, whereas the external skin 113*b* of the semi-cylindrical part 113 forms a wall of the secondary duct 107.

Each half-shell 111 is articulated to the pylon 102 so as to pivot about an axis parallel to the axis X between a closed position (FIG. 3*a*), in which the half-shell 111 is closely fitted around the engine 105 by way of its semi-cylindrical part 113 which partially surrounds the engine 105, and an open position (FIG. 3*b*), in which the half-shell 111 is away from the engine 105.

The articulated connection 114 of each half-shell 111 to the engine 105 is formed by at least one hinge arranged on the portion of upper bifurcation 109*a*.

The propulsion assembly 100 comprises various fluid circuits C (just one of which is shown in the figures) for supplying the engine 105 with fluids it needs to operate. Each fluid circuit C comprises various components (not shown) arranged in the pylon 102 and/or the engine 105, such as a tank and pumps, which are connected to one another by pipes. The following description also concerns just one part of the complete fluid circuit, this part being referred to as fluid circuit C.

The propulsion assembly 100 comprises a cooling circuit R connected to a fluid circuit C for controlling the temperature of the fluid. Such a cooling circuit R belongs to a half-shell 111 and comprises at least one air/fluid heat exchanger 115 and pipes (not shown) for the circulation of the fluid. In each of the exchangers 115, a core is brought into contact with a stream of (cold) air withdrawn from the secondary duct 107 in order to cool the (hot) fluid as it passes through the core. The exchangers 115 and the pipes of the cooling circuit R are arranged in the thickness of the half-shell 111.

According to the invention, the propulsion assembly 100 comprises a detachable hydraulic interface 120 for connecting the fluid circuit C and the cooling circuit R when the half-shell 111 bearing the cooling circuit R is in the closed position (FIG. 3*a*), and disconnecting the fluid circuit C and the cooling circuit R when the half-shell 111 is moved out of its closed position (FIG. 3*b*).

Figure 4:
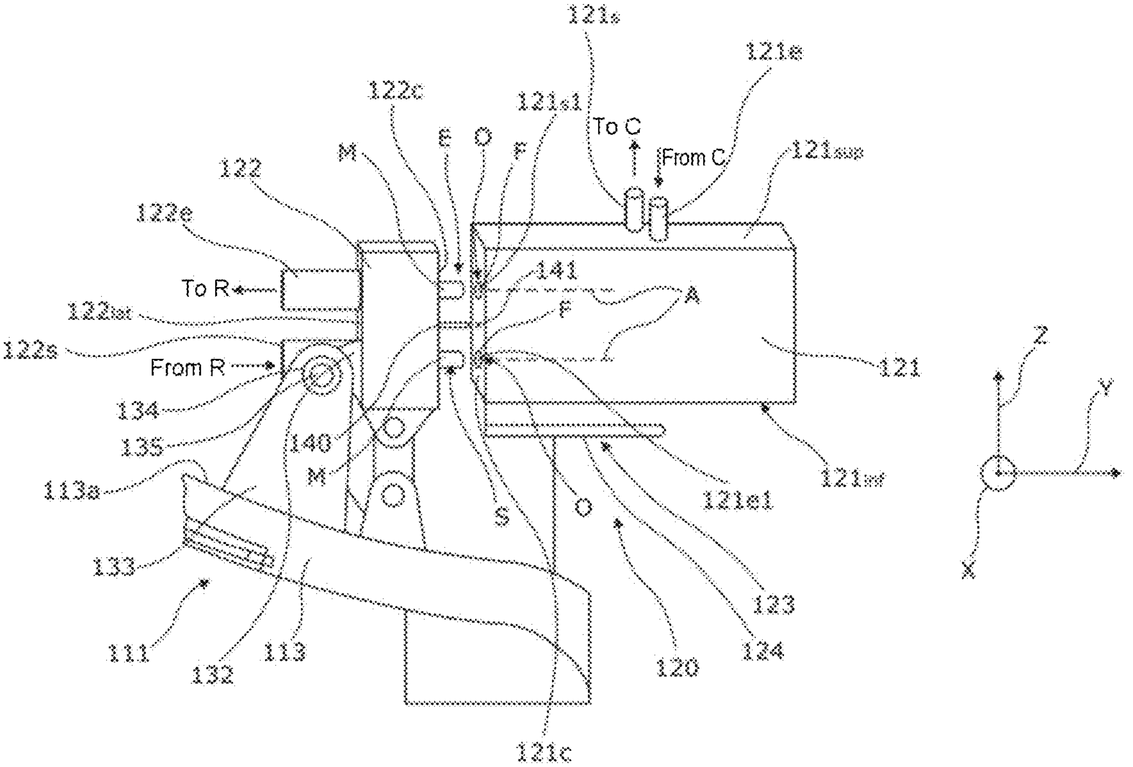
FIG. 4 is an enlarged schematic view of the zone W represented in FIG. 3*a* and showing a central distributor/collector hydraulically connected to a satellite distributor/collector according to one embodiment of the invention.

The detachable hydraulic interface 120 between the fluid circuit C and the cooling circuit R comprises at least a quick-fit fluid-inlet coupling E and at least a quick-fit fluid-outlet coupling S. FIG. 4 particularly clearly shows that each quick-fit coupling E, S comprises a male element M and a female element F which are intended for axial fitting of one in the other along a fitting direction parallel to a fitting axis A and for being released from one another by an operator.

The number of quick-fit fluid-inlet couplings (E) and quick-fit fluid-outlet couplings(S) depends on the flow rate of fluid to be channeled between the fluid circuit C and the cooling circuit R.

For each quick-fit coupling (E, S), one of its male/female elements is fixed to the internal skin 113*a* of the semi-cylindrical part 113 of the half-shell 111, and the other of its male/female elements is fixed to and underneath the engine 105.

In the embodiment shown in FIGS. 4 to 7, the detachable hydraulic interface 120 comprises a single quick-fit fluid-inlet coupling E and a single quick-fit fluid-outlet coupling S, and thus two female elements F and two male elements M.

The female elements F are all arranged in a fluid distributor/collector 121, referred to as central distributor/collector, which is hydraulically connected to the fluid circuit C and fixed to the engine 105, being arranged beneath the latter. The male elements M are all arranged in a fluid distributor/collector 122, referred to as satellite distributor/collector, which is integral with the semi-cylindrical part 113 of the half-shell 111 and hydraulically connected to the cooling circuit R. More specifically, the satellite distributor/collector is fixed to the internal skin 113*a* of the semi-cylindrical part 113 of the half-shell 111.

Each of the male M or female F elements of a quick-fit coupling E, S is in the form of a hollow elongate body, notably to allow the passage of the fluid within it. The longitudinal axis of the body of the female element is parallel to the fitting axis A.

The body of the male element M comprises a relief M1 (shown in FIG. 5) and the body of the female element F has an opening O made in it for fitting the male element M into the female element F. The interface 120 comprises locking means which are releasable by an operator, are described in more detail later on in the description, and are configured to engage with the relief M1 of the male element M to keep the male element M fitted in the female element F.

Each female element F is equipped with a maneuvering sheath 116 (shown in FIG. 5) which slides along the fitting axis A, and is able to engage with the male element M to retain the male element by way of the engagement of the male element M in the sheath of the female element F.

The maneuvering sheath 116 is movable in translation between two positions. The axial movement of the maneuvering sheath from one position to the other, brought about by the operator manipulating a handle 124, causes the locking means to be released, and this leads to the disengagement of the male element M from the female element F, and the male element can thus be unsheathed (freed) from the female element F.

The locking means are as described, for example, in patent U.S. Pat. No. 3,873,062 and comprise a ring which has an opening oriented axially with respect to the body of the female element F and is integral with longitudinal grips that are profiled so as to engage, under the effect of elastic means connected to said ring, by way of their free end in the relief of the male element, which takes the form of an external peripheral groove.

Each of the central distributor/collector 121 and satellite distributor/collector 122 is in the form of a parallelepipedal machined block extending longitudinally along a direction parallel to the axis X.

The central and satellite distributors/collectors 121, 122 are positioned such that the central distributor/collector 121 has a lateral face 121*c*, referred to as contact face, which faces a lateral face 122*c*, also referred to as contact face, of the satellite distributor/collector 122 when the half-shell 111 is in its closed position. The contact faces 121*c*, 122*c* are parallel to one another when the half-shell 111 is in its closed position and face one another.

The central distributor/collector 121 comprises:

- on an upper face 121*sup*, which faces the engine 105, fixing means 121*f* (shown only in FIG. 6) for fixing the machined block to the engine 105 and a fluid inlet and outlet 121*e*, 121*s*, referred to as main inlet and outlet, for hydraulically connecting the machined block to the fluid circuit C by means of pipes (not shown);
- on its contact face 121*c*, a fluid inlet and outlet 121*e*1, 121*s*1, referred to as secondary inlet and outlet, each secondary inlet/outlet being a female element F intended to be coupled to a male element M of the satellite distributor/collector 122. The fitting axes A of the female elements of the central distributor/collector are all parallel to one another, and orthogonal to the aforementioned contact face 121*c* and the female elements F are integrally arranged in the machined block with their openings O flush with the contact face 121*c;*
- an internal hydraulic pathway (not shown) for conveying the fluid from the main fluid inlet 121*e* to the secondary fluid outlet 121*s*1, and from the secondary fluid inlet 121*e*1 to the main fluid outlet 121*s;*
- a release mechanism 123 which can be manipulated by an operator to release the locking means of the female elements F by acting on the maneuvering sheaths of the female elements F in order to move them between their first and second positions and thus make it possible to withdraw the male elements M from the female elements F.

The fixing means 121*f* for fixing the central distributor/collector 121 to the engine 105 comprise, at a first, second and third corner of the upper face of the machined block, clevis blocks 125 with two branches. The clevis blocks are all oriented in planes perpendicular to the axis X. At each of the three clevis blocks 125, a first end of a link rod 126 is mounted without play between the branches via a plain bearing through which passes a pivot pin (not shown) fitted in each of the branches, whereas the second end of the link rod is fixed without play, via a pin, to a fitting (not shown) integral with the engine 105. The fixing of the machined block via these three clevis blocks makes it possible to eliminate the degree of freedom about Y.

At a fourth corner of the upper face 121*sup*, a clevis block 127 with two branches, which are oriented parallel to the axis X, is fixed to a fitting 128 integral with the engine 105. The fitting 128 comprises a flat part arranged between the two branches of the clevis block 127. A pivot pin (not shown) fitted in each of the branches of the clevis block 127 and in the flat part of the fitting 128 connects the fitting 128 and the clevis block 127 without play. This disposition makes it possible to eliminate the degrees of freedom about X and about Z.

Figure 5:
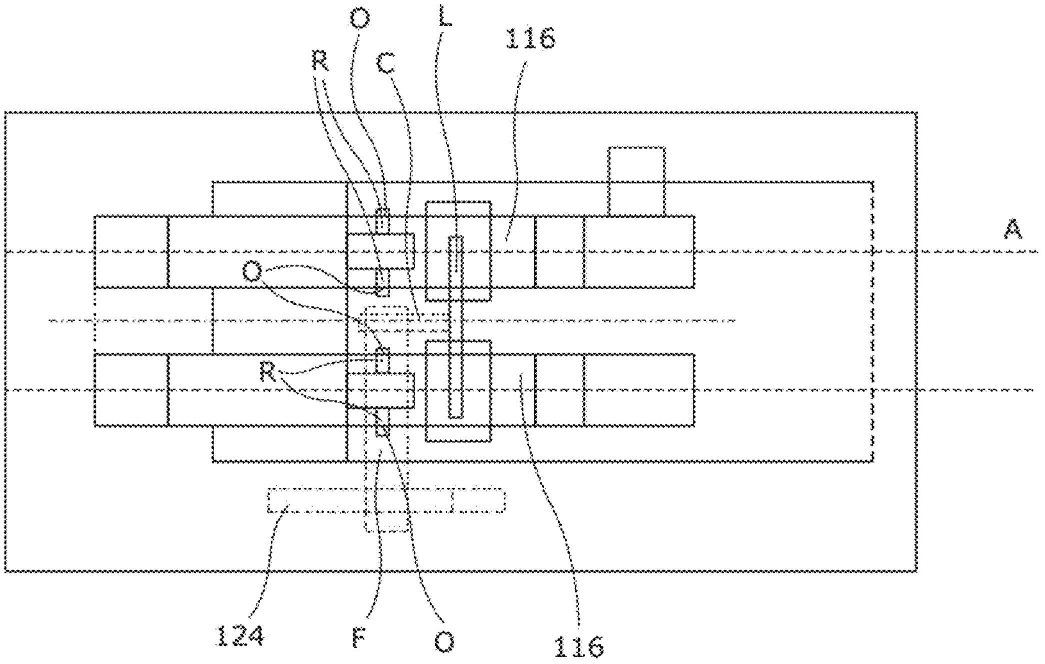
FIG. 5 is a schematic top view of the hydraulic connection per se between a central distributor/collector and a satellite distributor/collector according to one embodiment of the invention.
Figure 6:
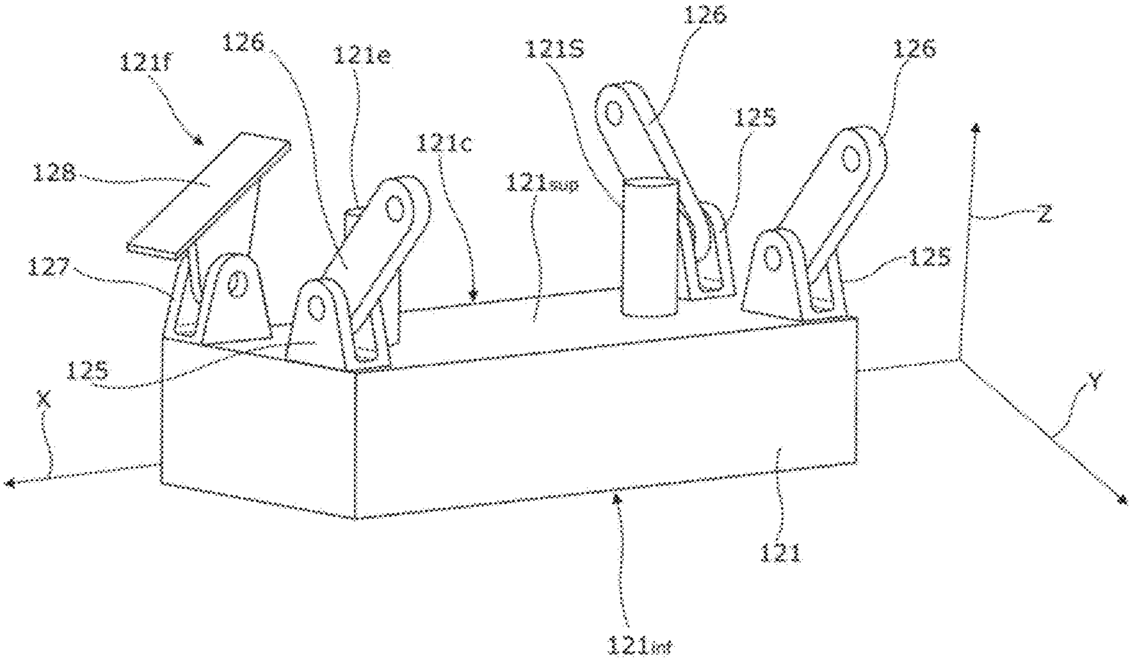
FIG. 6 is a schematic view, in perspective, of the central distributor/collector in FIG. 4.
Figure 7:
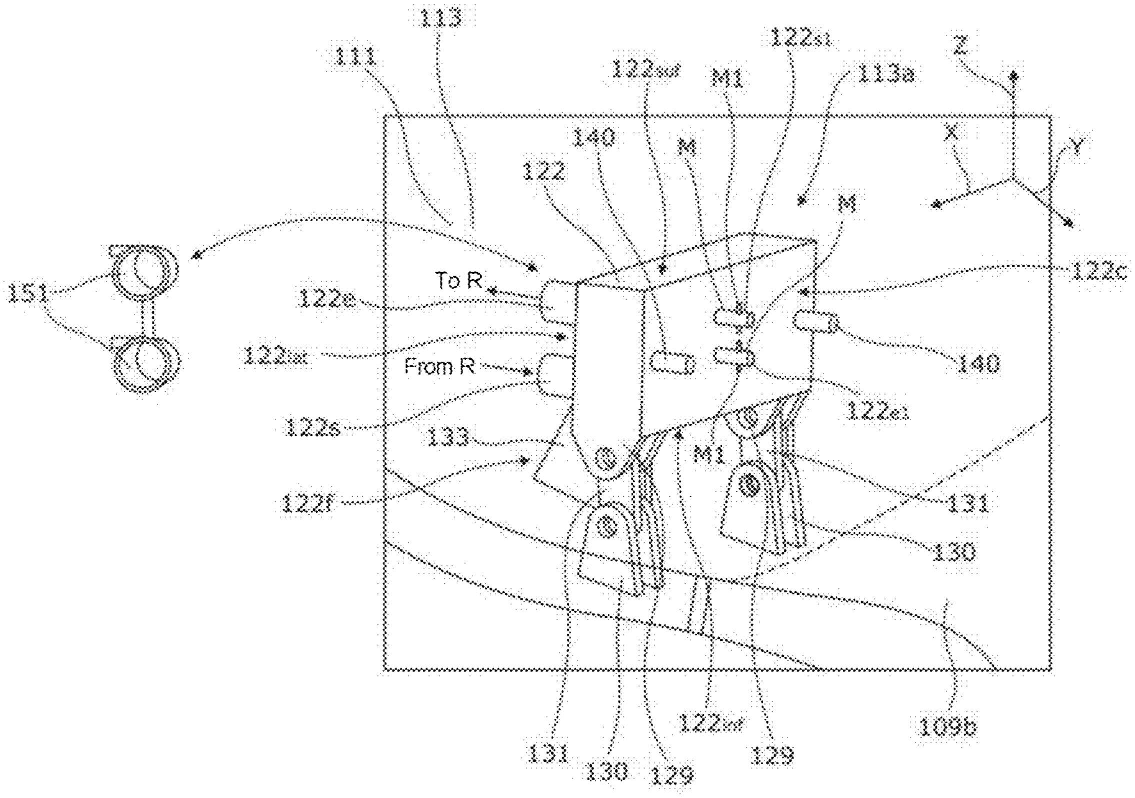
FIG. 7 is a schematic view, in perspective, of the satellite distributor/collector shown in FIG. 4.

In one embodiment, shown in FIGS. 4, 5 and 7, the maneuverable release mechanism 123 comprises:

- a handle 124 (shown in FIG. 4) mounted rotatably on a lower face 121*inf* of the machined block with an axis perpendicular to the upper/lower faces 121*sup*, 121*inf* of the machined block;
- a shaft F (shown in FIG. 5), one of the ends of which is fixed to the handle 124 and to which at the other end is fixed a cam C.

The sheaths 116, whether there are two of them, as in the present embodiment illustrated, or more, are all connected to one another, in pairs, by connecting pins L. When an operator rotates the handle 124, the shaft F pivots on itself and causes the cam C to pivot. By pivoting, the cam pushes back the maneuvering sheaths 116 connected to one another by the connecting pin L (just one of them in the example illustrated owing to there only being two sheaths) and allows them to move simultaneously along a direction parallel to the fitting axes A, between a first position in which the sheaths enable the connection with the male elements and a second position in which the male and female elements are disconnected. The passage from the first to the second position of the cam C triggers the unlocking of the reliefs M1 and allows the withdrawal of the male elements M fitted in the female elements F.

The satellite distributor/collector 122 comprises:

- on a lower face 122*inf* and on a lateral face 122*lat*, both of which face the internal skin 113*a* of the half-shell 111, fixing means for fixing the machined block to the half-shell 111;
- on its contact face 122*c*, which faces the contact face 121*c* of the central distributor/collector 121, a fluid inlet and outlet 122*e*1, 122*s*1, referred to as secondary inlet and outlet, each secondary inlet and outlet being a male element M intended to be coupled to a female element F of the central distributor/collector 121. The bodies of the male elements M extend at least partially outside of the contact face 122*c;*
- on a different face than the contact face 122*c*, for example on the lateral face 122*lat* opposite the contact face 122*c*, as illustrated in FIGS. 4 and 7, a fluid inlet and outlet 122*e*, 122*s*, referred to as main inlet and outlet, for hydraulically connecting the machined block to the cooling circuit R by means of pipes (not shown);
- an internal hydraulic pathway being provided for conveying the fluid from the secondary fluid inlet 122*e*1 to the main fluid outlet 122*s*, and from the main fluid inlet 122*e* to the secondary fluid outlet 122*s*1.

The half-shell 111, owing notably to its flexibility (it is made of composite material), which is exaggerated by its dimensions (diameter of over one meter), deforms during flight. The fixing means 122*f* for fixing the satellite distributor/collector 122 to the half-shell 111 are consequently configured such that the connection of the cooling circuit to the fluid circuit C via the detachable hydraulic interface 120 remains operational during flight.

FIGS. 4 and 7 particularly clearly show that the fixing means 122*f* for fixing the satellite distributor/collector to the half-shell 111 are designed such that said distributor/collector is mounted in floating fashion on the half-shell 111.

In detail:

- a fitting 132 is arranged on the machined-block lateral face 122*lat* that faces the half-shell 111 and comprises a flat part extending along the transverse axis Y. The flat part extends parallel to a flat part of a fixing flange 133 fixed to the half-shell 111. The fixing flange 133 comprises a through-bore 134 arranged on its flat part whereas the fitting 132 comprises a spigot 135 which projects out of its flat part, parallel to the axis X, and is received in the bore of the fitting 133. The spigot 135 is cylindrical and the bore has a dimension greater (about 2 to 5 times greater) than that of the spigot so as to permit a rotational movement of the machined block about an axis parallel to the axis X;
- two clevis blocks 129 with two branches are situated on the lower face 122*inf* of the machined block, at a distance from the other clevis block, and two clevis blocks 130 with two branches are situated on the internal skin 113*a* of the half-shell 111, and each of the aforementioned clevis blocks 129 of the machined block faces a clevis block 130 with two branches that is integral with the half-shell 111. The branches of the clevis blocks 129, 130 are all oriented along an axis perpendicular to the axis X. The clevis blocks 129 of the machined block and the clevis blocks of the half-shell 111 are connected in pairs in each case by means of a link rod 131 arranged, at each of its two ends, between the two branches of a clevis block 129, 130. The link rod 131 is fixed to each of the clevis blocks 129, 130 via a swivel bearing which is inserted in a bore of the link rod and through which a pivot pin fitted in each of the branches of the clevis block passes. The distance between the branches of the clevis block 129, 130 is greater (for example, about 2 to 5 times greater) than the thickness of the link rod 131 so as to permit a translational movement of the link rod 131 between the branches of the clevis blocks 129, 130, i.e. along the axis X.

In order to make it easier for the operators to fit the male elements M in the female elements F, the satellite distributor/collector 122 comprises first centering means and the central distributor/collector 121 comprises second centering means, intended to engage with the first centering means on passage of the half-shell 111 from the open position to the closed position so as to position the contact face 122*c* of the satellite distributor/collector 122 in a suitable position facing the contact face 121*c* of the central distributor/collector 121, when the half-shell 111 is moved towards its closed position.

In the example illustrated in FIG. 7, the first centering means comprise two centering pins 140 arranged on the contact face of the satellite distributor/collector 122 and the second centering means comprise two bores 141 (just one of which is shown) arranged on the contact face 121*c* of the central distributor/collector 121 in a complementary pattern to the pattern formed by the centering pins 140 on the contact face 122*c* of the satellite distributor/collector 122. Each of the centering pins 140 is intended to be inserted, on a movement of the half-shell 111 towards its closed position, into an associated bore 141 to realize the correct positioning of the central distributor/collector 121 and satellite distributor/collector 122.

The entrance of the bores 141 preferably comprises a countersink for making it even easier to insert the centering pins 140 into the bores 141.

Figure 8:
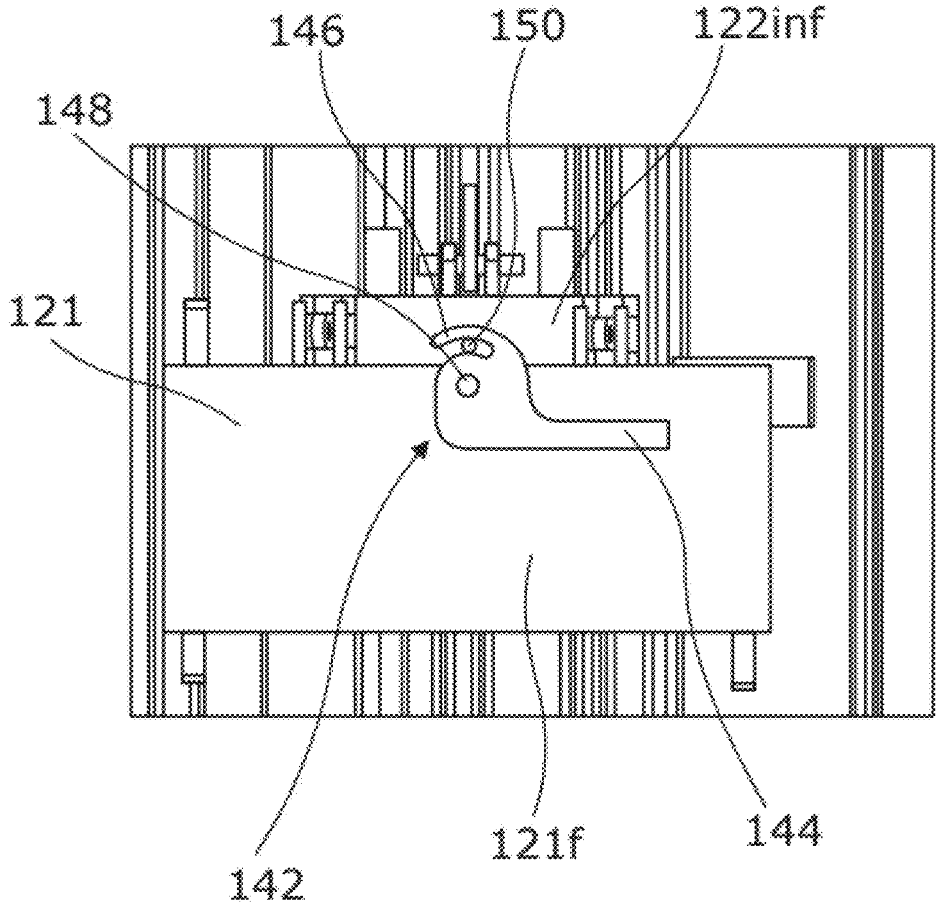
FIG. 8 is a schematic bottom view showing a locking system for locking a central distributor/collector to a satellite distributor/collector in the locked position according to one embodiment of the invention.
Figure 9:
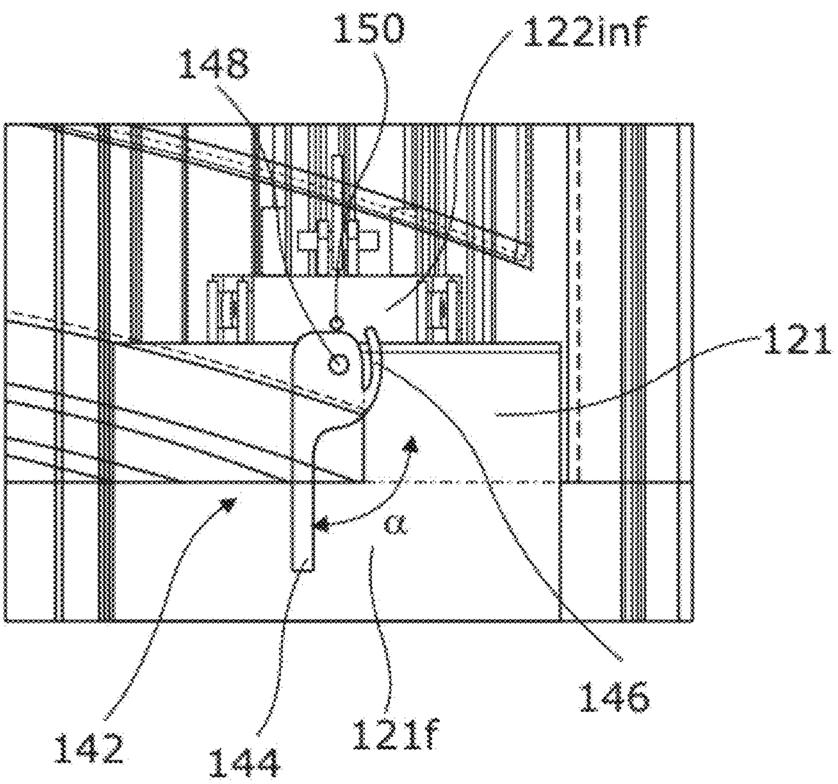
FIG. 9 is a schematic bottom view showing the locking system in FIG. 8 in the unlocked position; and, FIG. 10 is a schematic side view of an aircraft provided with a propulsion assembly according to the present invention.
Figure 10:
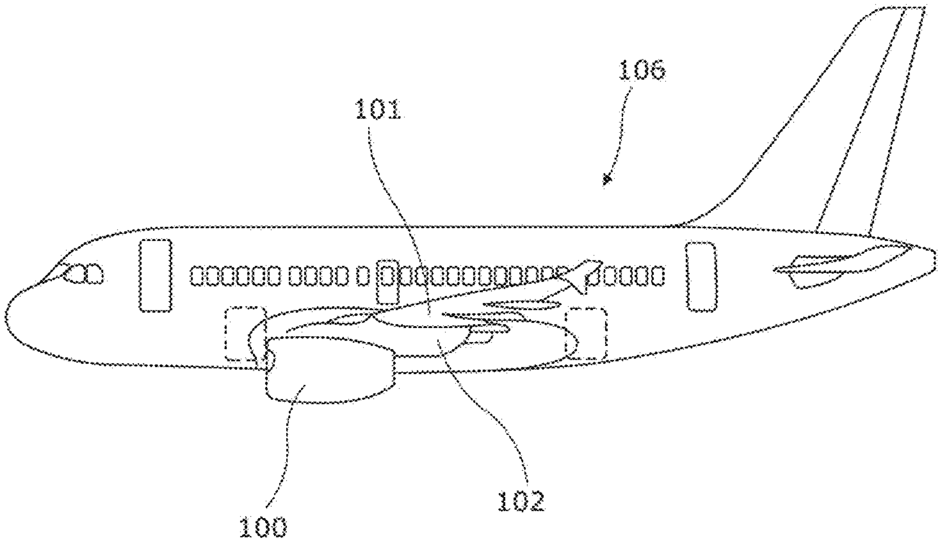

As shown in FIGS. 8 and 9, the propulsion assembly 100 is equipped with a locking system 142 which is intended for locking the satellite distributor/collector to the central distributor/collector and can be activated by an operator once the male M and female F elements are fitted together. The activation of the locking system 142 adds a degree of security aimed at preventing the unintended uncoupling of the male M and female F elements during flight. The locking system 142 is, for example as illustrated in FIGS. 8 and 9, of the type involving a lever 144 provided with a hook 146 which is rotatably articulated about a pin 148 of the central distributor/collector 121 that is perpendicular to the plane of the face 121*inf*. The lever 144 is intended to engage with another element, such as a rod 150, situated on the lower face 122*inf* of the satellite distributor/collector 122. The lever 144 is rotatably articulated about the pin 148 between a position in which the lever is hooked on the rod 150 (FIG. 8) and a position, after a rotation of 90 degrees through an angle $\alpha$, in which the hook 146 releases the rod 150 to enable the opening of the half-shell 111 (FIG. 9). An access hatch (not shown) is in this case necessary on the half-shell 111 to access the lever 144. To avoid adding a hatch, the lever function could be combined with that of the handle 124.

As shown in FIG. 7, during maintenance operations, in particular in polluted environments, caps 151 can cover the unconnected hydraulic connections throughout the maintenance and be removed in order to couple the connections before closing the half-shells 111. To avoid forgetting this, the caps can be connected to one another in the geometric configurations of the connections they are to protect. FIG. 7 shows an example of caps linked to one another and intended to cover the fluid inlet and outlet 122*e*, 122*s*.

The invention has been described in the case in which just one half-shell 111 is equipped with a cooling system R. In the case in which the two half-shells are equipped with a cooling circuit, then the fluid circuit C and each cooling circuit R are connected to one another via a detachable hydraulic interface arranged underneath the engine 105. A first detachable hydraulic interface is intended to connect the fluid circuit C to the cooling circuit R arranged in a first half-shell 111 and a second detachable hydraulic interface is intended to connect the fluid circuit C to the cooling circuit arranged in a second half-shell.

Reprising the embodiment described above, but this time applied to the case in which each of the two half-shells is equipped with a cooling system R, there are two possible alternatives:

- a first alternative, in which there are two central distributors/collectors fixed underneath the engine 105, with one central distributor/collector being specific to each half-shell, which is itself equipped with a satellite distributor/collector. The two central distributors/collectors and satellite distributors/connectors are as described above, and the central distributors/collectors are underneath the engine 105 one after the other;
- a second alternative in which there are two satellite distributors/collectors as described above, with one satellite distributor/collector per half-shell, and a single central distributor/collector fixed underneath the engine 105 is intended to interface with each of the two satellite distributors/collectors in an identical way to what was described above. The central distributor/collector comprises secondary fluid inlets/outlets on a first and a second lateral face that are opposite one another and each extend along the axis X.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, the propulsion assembly comprising:

an engine;

two half-shells arranged one on each side of a longitudinal median plane of the engine, wherein each half-shell comprises an upper bifurcation continued by a semi-cylindrical part, each half-shell being configured to be articulated to a pylon at said upper bifurcation and configured to move between a closed position, in which the half-shell is closely fitted around the engine by way of said semi-cylindrical part that partially surrounds the engine, and an open position, in which the half-shell is away from the engine; and, a fluid circuit;

wherein at least one half-shell is equipped with a cooling circuit connected to the fluid circuit, wherein said at least one half-shell comprises a detachable hydraulic interface between the fluid circuit and the cooling circuit, the detachable hydraulic interface comprising at least two quick-fit couplings, wherein each of the quick-fit couplings comprises a pair of elements configured for axial fitting of one element of the pair into the other element of the pair, with one element of each pair being fixed on the semi-cylindrical part of the half-shell and the other element of said pair being integral with the engine, wherein one of the elements of each pair comprises a male element and the other element comprises a female element, wherein the satellite distributor/collector is fixed, with play, on the half-shell.

2. The propulsion assembly according to claim 1, wherein each male element and each female element comprises a hollow elongate body, wherein the hollow elongate body of each male element comprises a relief, wherein the hollow elongate body of each female element comprises an opening made for fitting a male element into the female element and comprises locking means configured to be released by an operator and configured to engage with a relief of the male element to keep a male element fitted in the female element after the male element has been inserted in the female element further than a predetermined travel when the half-shell is being moved towards the closed position.

3. The propulsion assembly according to claim 2, wherein the female elements are all arranged in a fluid distributor/collector, referred to as central distributor/collector, which is hydraulically connected to the fluid circuit and fixed to the engine, and wherein the male elements are all arranged in a fluid distributor/collector, referred to as satellite distributor/collector, which is hydraulically connected to the cooling circuit and fixed to a circular part of the half-shell.

4. The propulsion assembly according to claim 3, wherein the central distributor/collector comprises a parallelepipedal machined block having a face, referred to as contact face, on which the openings of the female elements of the quick-fit couplings are arranged, the female elements being integrally arranged in the block and having fitting axes are orthogonal to said contact face.

5. The propulsion assembly according to claim 4, wherein the central distributor/collector comprises a release mechanism configured to be manipulated by an operator to release the locking means of the female elements.

6. The propulsion assembly according to claim 3, wherein the satellite distributor/collector comprises a parallelepipedal machined block having a face, referred to as contact face, from which the male elements of the quick-fit couplings project.

7. The propulsion assembly according to claim 3, wherein the satellite distributor/collector comprises first centering means and the central distributor/collector comprises second centering means, the first and the second centering means configured to engage with one another on passage of the half-shell from the open position to the closed position.

8. An aircraft comprising:

a wing a pylon fixed to the wing, the propulsion assembly according to claim 1 mounted to the pylon, each half-shell being articulated to the pylon at said upper bifurcation so as to pivot between the open position and the closed position.

* * * * *